United States Patent
Yenduri et al.

(10) Patent No.: US 9,544,202 B2
(45) Date of Patent: Jan. 10, 2017

(54) DYNAMIC ASSIGNMENT AND ENFORCEMENT OF APPLICATION-DRIVEN PER-CONNECTION SERVICE LEVEL AGREEMENTS

(71) Applicant: Oracle International Corporation, Redwood Shores, CA (US)

(72) Inventors: Bhargava K. Yenduri, Santa Clara, CA (US); Nicolas G. Droux, Rio Rancho, NM (US)

(73) Assignee: Oracle International Corporation, Redwood Shores, CA (US)

( * ) Notice: Subject to any disclaimer, the term of this patent is extended or adjusted under 35 U.S.C. 154(b) by 484 days.

(21) Appl. No.: 14/014,004

(22) Filed: Aug. 29, 2013

(65) Prior Publication Data

US 2015/0063372 A1 Mar. 5, 2015

(51) Int. Cl.
 *H04L 12/24* (2006.01)
 *H04L 29/06* (2006.01)
(52) U.S. Cl.
 CPC ........... *H04L 41/5051* (2013.01); *H04L 63/00* (2013.01); *H04L 41/5077* (2013.01)
(58) Field of Classification Search
 CPC .... H04L 12/2464; H04L 69/14; H04L 67/322; H04L 41/5096; H04L 69/321; H04L 69/322
 See application file for complete search history.

(56) References Cited

U.S. PATENT DOCUMENTS 7,600,007 B1 10/2009 Lewis
2011/0296019 A1* 12/2011 Ferris .................... H04L 47/70
                                                    709/226

(Continued)

FOREIGN PATENT DOCUMENTS

EP    1049297 A2   11/2000
EP    1120979 A1    8/2001

(Continued)

OTHER PUBLICATIONS

Deitel et Al "Operating Systems" Third Edition, 2004.*

(Continued)

*Primary Examiner* — Robert M Morlan
(74) *Attorney, Agent, or Firm* — Osha Liang LLP

(57) ABSTRACT

A method for handling connection requests. The method includes receiving, by an operating system (OS), a request from an application to create a connection, wherein the request comprises a connection identifier and a service-level agreement (SLA), determining that the application is authorized to create the connection, creating the connection targeting the application in response to the determination that the application is authorized to create the connection, and applying the SLA to the connection in response to the determination that the application is authorized to create the connection. The method further includes receiving incoming data targeting the connection identifier from a network, processing, by a network protocol stack on the OS, the incoming data according to the SLA to obtain processed incoming data, and providing the processed incoming data to the application. Similar processing may be done on outgoing data from the application to the network.

15 Claims, 8 Drawing Sheets

(56) References Cited

U.S. PATENT DOCUMENTS

| | | | | |
|---|---|---|---|---|
| 2012/0023190 A1* | 1/2012 | Backholm | ............... | H04W 4/18 709/217 |
| 2012/0300706 A1 | 11/2012 | Kahn et al. | | |
| 2012/0327778 A1* | 12/2012 | Stanwood | ......... | H04W 72/1242 370/237 |
| 2013/0329550 A1* | 12/2013 | Kotecha | .............. | H04W 76/025 370/230 |
| 2014/0208088 A1* | 7/2014 | Somani | ............... | G06F 9/44505 713/1 |

FOREIGN PATENT DOCUMENTS

| | | | |
|---|---|---|---|
| WO | 2006/074380 | A2 | 7/2006 |
| WO | 2006/109187 | A2 | 10/2006 |

OTHER PUBLICATIONS

Tripathi, S., Droux, N., Srinivasan, T., and Belgaied, K; "Crossbow: from hardware virtualized NICs to virtualized networks," Proceedings of the 1st ACM workshop on Virtualized infrastructure systems and architectures; Barcelona, Spain; Aug. 17, 2009 (9 pages).

Oracle Platform Development Studio Developer's Guide Service Interceptor http://docs.oracle.com/cd/E14148_02/wlcp/ocsg41_otn/extension/interceptors.html; Accessed Mar. 27, 2013 (11 pages).

Pekar, A., Fecil'ak, P., Michalko, M., Giertl, J., Reves, M; "SLAmeter—the Evaluator of Network Traffic Parameter," ICETA 2012 10th IEEE International Conference on Emerging eLearning Technologies and Applications; Nov. 8-9, 2012; http://www.iceta.sk/proceedings/Iceta2012_Pekar.pdf (5 pages).

* cited by examiner

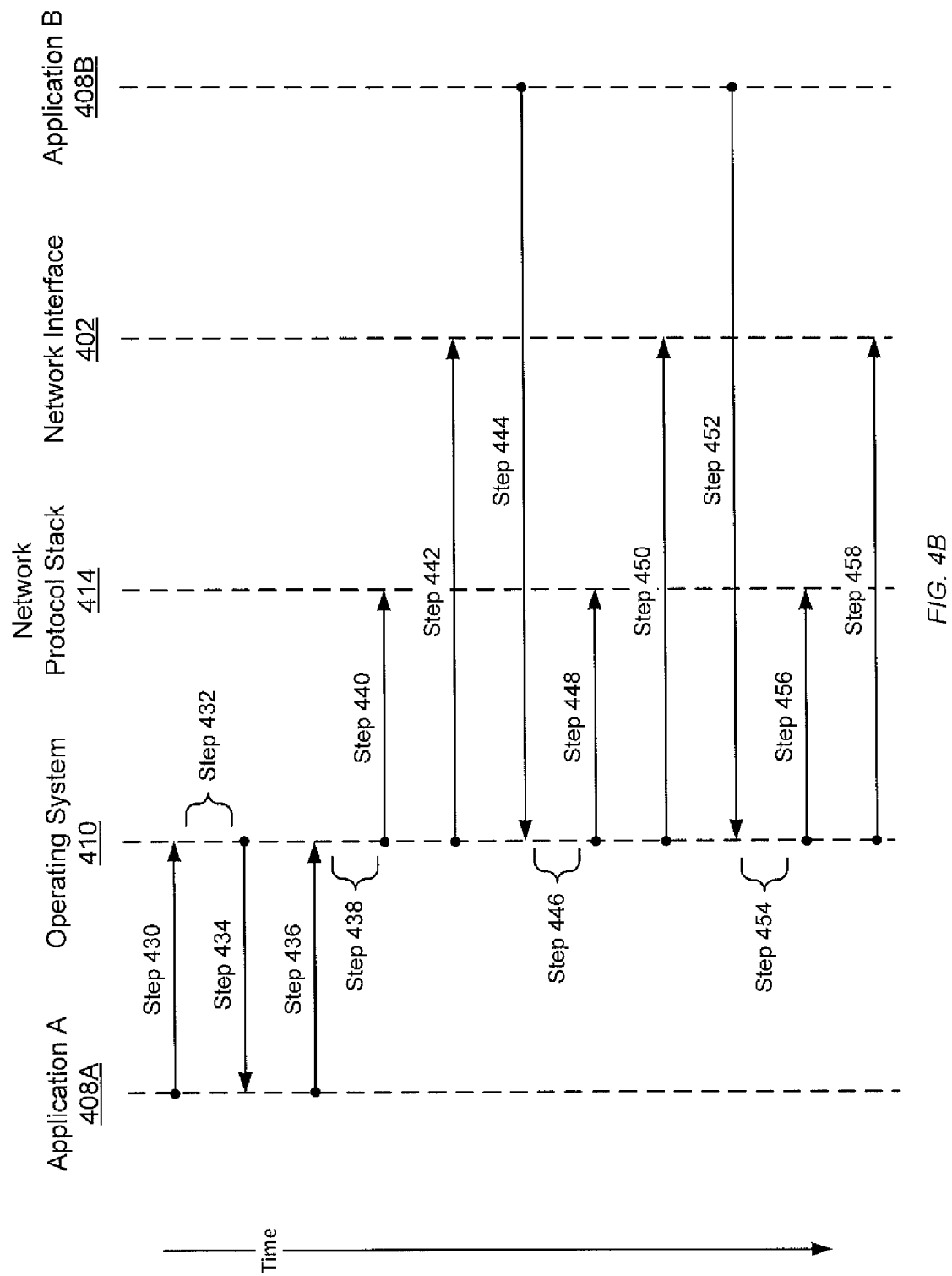

DYNAMIC ASSIGNMENT AND ENFORCEMENT OF APPLICATION-DRIVEN PER-CONNECTION SERVICE LEVEL AGREEMENTS

BACKGROUND

Modern computer system can host a number of applications that each utilize the network connections on the system. Each application may use the network connection(s) for a different task or service. Further, a single application may perform different tasks and provide different services using the same network connection(s). One feature of modern computer networks is that much of the data encapsulated in packets is frequently ignored or invisible to most intermediary network devices that route packets. As a result, most intermediary network devices treat all packets the same, regardless of the application, task, or service associated with the packet.

SUMMARY

In general, in one aspect, embodiments of the invention relate to a method for handling connection requests. The method includes receiving, by an operating system (OS), a first request from an application to create a first connection, wherein the first request comprises a first connection identifier and a first service-level agreement (SLA), determining, by the OS, that the application is authorized to create the first connection, creating, by the OS, the first connection targeting the application in response to the determination that the application is authorized to create the first connection, and mapping the first connection to the first SLA in response to the determination that the application is authorized to create the first connection. The method further includes receiving first incoming data targeting the first connection identifier from a network, processing, by a network protocol stack on the OS, the first incoming data according to the first SLA to obtain first processed incoming data, and providing, by the OS, the first processed incoming data to the application.

In general, in one aspect, embodiments of the invention relate to a non-transitory computer readable medium comprising instructions that, when executed by a computer processor, perform a method for handling connection requests. The method includes receiving, by an OS, a first request from an application to create a first connection, wherein the first request comprises a first connection identifier and a first service-level agreement (SLA), determining, by the OS, that the application is authorized to create the first connection, creating, by the OS, the first connection targeting the application in response to the determination that the application is authorized to create the first connection, and mapping the first connection to the first SLA in response to the determination that the application is authorized to create the first connection. The method further includes receiving first incoming data targeting the first connection identifier from a network, processing, by a network protocol stack on the OS, the first incoming data according to the first SLA to obtain first processed incoming data, and providing, by the OS, the first processed incoming data to the application.

In general, in one aspect, embodiments of the invention relate to a system for handling connection requests. The system includes a computer processor, an OS, and a network protocol stack. The OS is executing on the computer processor and is configured to receive a first request from an application to create a first connection, wherein the first request comprises a first connection identifier and a first service-level agreement (SLA), determine that the application is authorized to create the first connection, create the first connection targeting the application in response to the determination that the application is authorized to create the first connection, and map the first connection to the first SLA in response to the determination that the application is authorized to create the first connection. The network protocol stack is configured to receive first incoming data targeting the first connection identifier from a network, process the first incoming data according to the first SLA to obtain first processed incoming data, and provide the first processed incoming data to the application.

Other aspects of the invention will be apparent from the following description and the appended claims.

BRIEF DESCRIPTION OF DRAWINGS

FIGS. 4A-4D show an example in accordance with one or more embodiments of the invention.

DETAILED DESCRIPTION

Figure 1:
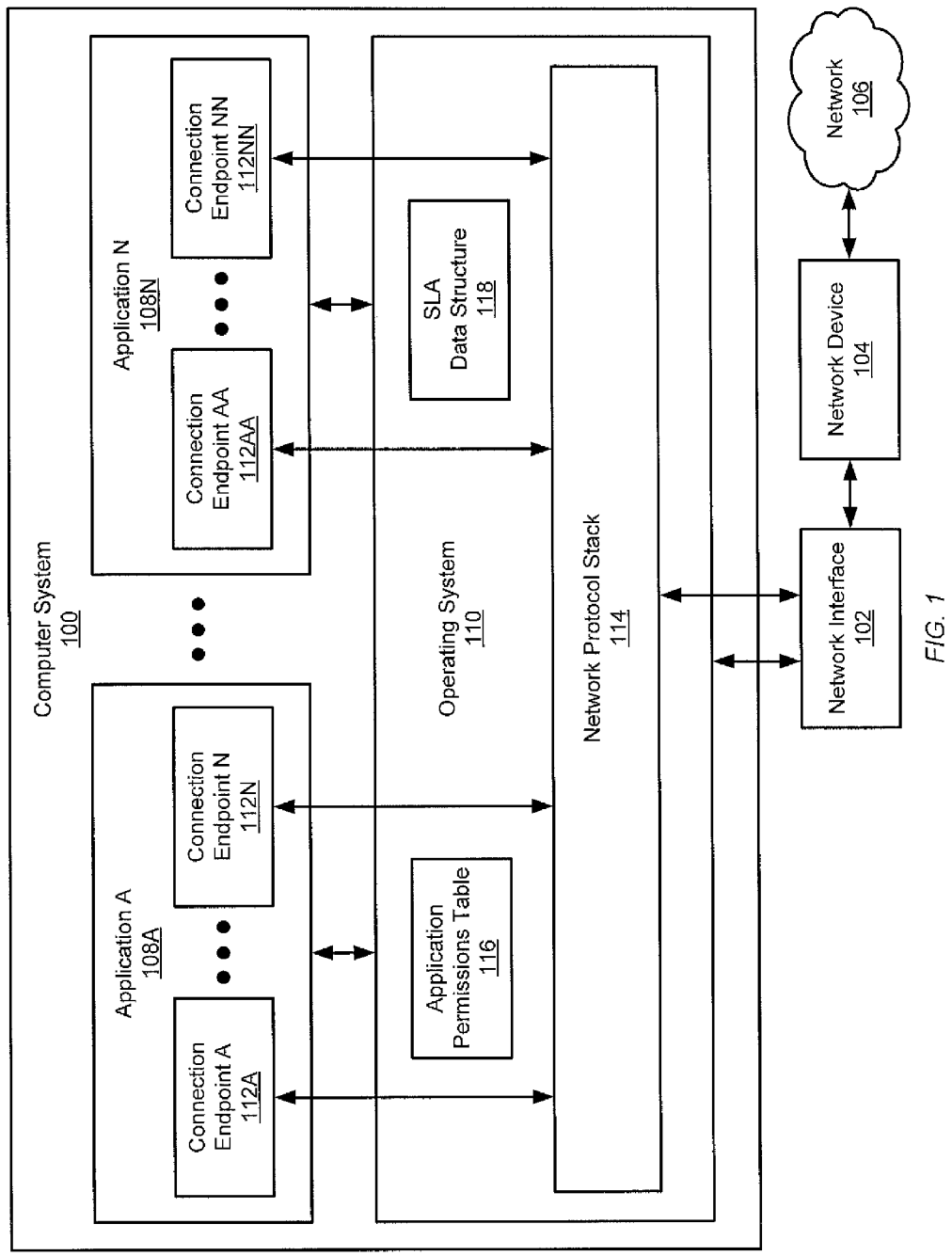
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for dynamic assignment and enforcement of application-driven per-connection service level agreements (SLAs). Specifically, embodiments of the invention may be used to provide applications the ability to set and change the treatment of connections by the hardware and software elements handling the connection. Further, embodiments of the invention may be used to expose processes at lower levels of the network protocol stack to the connection handling instructions set by an application. Further, embodiments of the invention enable an application to set different SLAs for different connections targeting the same application, and have those SLAs enforced by the lower levels of the network protocol stack, network interfaces, and network devices along the path of the connection.

FIG. 1 shows a diagram of a system in accordance with one or more embodiments of the invention. As shown in FIG. 1, the system includes a computer system (100) communicatively coupled to a network interface (102). The network interface (102) provides the computer system (100) access to the network (106). The computer system includes an operating system (OS) (110) hosting a number of applications (application A (108A), application N (108N)). Each application (application A (108A), application N (108N)) includes one or more connection endpoints (connection endpoint A (112A), connection endpoint N (112N), connection endpoint AA (112AA), connection endpoint NN (112NN)). The OS (110) includes a network protocol stack (114), an application permissions table (116), and a SLA data structure (118).

In one or more embodiments of the invention, the computer system (100) is a group of software and hardware configured to host applications (application A (108A), application N (108N)) using the OS (110). Further details about the computer system (100) are provided in FIG. 5.

In one or more embodiments of the invention, the OS (110) provides an interface for applications (application A (108A), application N (108N)) to access resources on the computer system (100), including processing, storage, and communication resources. In one or more embodiments of the invention, the network protocol stack (114) is a group of processes with functionality to send and receive data on a network. Specifically, the network protocol stack is a set of software layers that prepares outgoing data for transmission on network links as packets and translates incoming packets into data for use by the target application (application A (108A), application N (108N)). In one or more embodiments of the invention, the network protocol stack (114) includes a Transmission Control Protocol (TCP) layer, an Internet Protocol (IP) layer, and a link layer.

In one or more embodiments of the invention, the network protocol stack (114) receives (e.g., via the OS (110)) outbound data from an application for transmission on the network (106). In one or more embodiments of the invention, the outbound data is processed for transmission on the network (106) by dividing the data into packets and storing a source address (e.g., containing the connection identifier) and a destination address in the packet.

In one or more embodiments of the invention, the network protocol stack (114) receives (e.g., via the network interface (102)) inbound packets from the network for delivery to an application (application A (108A), application N (108N)). In one or more embodiments of the invention, the inbound packets are processed for delivery to an application (application A (108A), application N (108N)) by combining the packets into data and delivering the data to an application (application A (108A), application N (108N)) associated with a connection identifier in the packet.

In one or more embodiments of the invention, the network interface (102) is a combination of hardware and software with functionality to provides an interface between the computer system (100) and the network (106). The network interface (102) may include an RJ-45 connector, a wireless antenna, or any other wired or wireless interface or any combination thereof. In one or more embodiments of the invention, outgoing packets generated by the network protocol stack (114) are provided to the network interface (102) for transmission on the network (106). In one or more embodiments of the invention, incoming packets from the network (106) are provided to the network protocol stack (114) by the network interface (102).

In one or more embodiments of the invention, the network interface (102) includes functionality to process incoming or outgoing packets. Specifically, the network interface (102) may process incoming packets in preparation for use by the network protocol stack (114) and may process outgoing packets in preparation for transmission on the network (104). Such processing may be in conjunction with the network protocol stack (114).

In one or more embodiments of the invention, the network interface (102) mirrors some or all of the packet processing functionality of the network protocol stack (114). Specifically, the network interface (102) may include functionality such that some or all of the packet processing performed by the network protocol stack (114) may be offloaded to the network interface (102). In other words, instances of the network protocol stack (114) may exist in whole or in part on the network interface (102). Packets or data generated by the offloaded processing performed by the network interface (102) may be provided to higher layers of the network protocol stack (114) or directly to the OS (110). Outgoing packet processing that is offloaded to the network interface (102) may provide the processed outgoing packets back to the OS (110). Inbound packet processing that is off-loaded to the network interface (102) may provide the resulting data or packets to OS (110) or network protocol stack (114).

In one or more embodiments of the invention, the network device (104) is a computer system or group of computer systems that route packets between and among other computer systems and network devices. In one or more embodiments of the invention, the network device (104) is part of the network (106) and is one of many network devices operating on the network (106). Embodiments of the network device (104) include, but are not limited to, network switches, network routers, and network gateways.

In one or more embodiments of the invention, the network (106) is a group of connected devices with functionality to transmit packets from one device to another. In one or more embodiments of the invention, the network (106) includes computer systems (e.g., computer system (100)) connected by network links to network devices (e.g., network device (104)). The network (106) may be implemented as a local area network or a wide area network, or a combination thereof. Further, the network (106) may include both physical and wireless network links.

In one or more embodiments of the invention, the applications (application A (108A), application N (108N)) are processes or group of processes with functionality to perform a task or set of related tasks for a user of the computer system (100). In one or more embodiments of the invention, the applications (application A (108A), application N (108N)) are server programs configured to service requests from other applications or elements on the network (106). Further, applications (application A (108A), application N (108N)) may be configured to transmit and receive data from other applications or elements using connections provided by the OS (110).

In one or more embodiments of the invention, a connection is a communication link between an application (application A (108A), application N (108N)) and other applications or elements on the same system (e.g., computer system 100) and/or other computer systems (not shown). Connections may be a service provided by the OS (110) allowing applications (application A (108A), application N (108N)) to create a connection endpoint (connection endpoint A (112A), connection endpoint N (112N), connection endpoint AA (112AA), connection endpoint NN (112NN)) that may be used by other applications and/or elements external to the application (application A (108A), application N (108N)) as a destination address for data. The payload of incoming packets addressed to a connection endpoint (connection endpoint A (112A), connection endpoint N (112N), connection endpoint AA (112AA), connection endpoint NN (112NN)) are routed by the OS (110) to the connection endpoint (connection endpoint A (112A), connection endpoint N (112N), connection endpoint AA (112AA), connection endpoint NN (112NN)) of the application (application A (108A), application N (108N)) associated with the connection.

In one or more embodiments of the invention, each connection has a corresponding connection identifier used by the OS (110) to differentiate connections from one another and to associate a specific connection with an application (application A (108A), application N (108N)). In one or more embodiments of the invention, the connection identifier includes the information necessary to create the connection (e.g., application creating the connection, location of the connection endpoint, etc.) if the connection has not been created. In one or more embodiments of the invention, the connection identifier functions as the source address for outgoing data for the connection and the target address for incoming data on the connection. In one or more embodiments of the invention, a connection is implemented as a network socket that is identified by a network address (e.g., an IP address) and port number.

In one or more embodiments of the invention, the OS (110) creates a connection by generating an association between the connection identifier and the connection target (i.e., the application (application A (108A), application. N (108N))) that requested the connection). Once a connection is generated targeting an application (application A (108A), application N (108N)), incoming data addressed to the connection identifier is routed by the OS (110) to the application (application A (108A), application N (108N)) associated with the connection identifier.

In one or more embodiments of the invention, the packets of different connections (such as network sockets) established on the same computer system (100) or by the same OS (110) are generally indistinguishable from one another after they are processed for transmission by an outgoing network protocol stack and before they are received and translated by an incoming network protocol stack. Specifically, connection identifiers of outgoing packets may be rendered unreadable by certain layers of the outgoing network protocol stack (network protocol stack (114)) and network devices (network device (104), and remain unreadable until the equivalent layer of the incoming network protocol stack (network protocol stack (114)) processes the packet. Consequently, lower layers of the network protocol stack (network protocol stack (114)), the network interface (102), and network devices (network device (104) along the connection may be unable to distinguish one connection from another.

In one or more embodiments of the invention, the application permissions table (116) is a collection of data that associates an application (application A (108A), application N (108N)) with OS tasks and/or system resources that the application (application A (108A), application N (108N)) has been authorized to utilize and/or is restricted from utilizing. Such OS tasks may include creating a connection and setting a SLA for a connection. In one or more embodiments of the invention, an application (application A (108A), application N (108N)) has a corresponding application identifier used by the OS (110) to reference that application (application A (108A), application N (108N)). In one or more embodiments of the invention, the application permissions table (116) is an index with mappings between application identifiers and corresponding OS tasks the application has been authorized to utilize. In one or more embodiments of the invention, the OS (108) uses the application permissions table (116) to determine whether an application is permitted to make a specified request and whether the request conforms to any limitations or restrictions for the application. For example, the application permissions table (116) may indicate that application A (108A) may set the priority of a connection, but not a minimum bandwidth. As another example, the application permissions table (116) may indicate that application A (108A) may set the priority of a connection, but is limited to setting the priority to either low or medium, but not high. For example, the application permissions table (116) may indicate that application A (108A) may set the priority in the SLA of a connection, but is limited to setting the priority to either low or medium, but not high.

In one or more embodiments of the invention, the SLA data structure (118) maps a connection to a SLA. In one or more embodiments of the invention, a SLA is a set of parameters describing the privileges and limitations to be applied in transmitting and processing the packets of the connection. A SLA may include, for example, a priority, a maximum bandwidth, and a minimum bandwidth. SLA parameters for a priority may include, for example, high, medium, or low. In one or more embodiments of the invention, a high priority SLA parameter indicates that the packets of the associated connection should be processed and/or transmitted ahead of, or more frequently than, packets of other connections with a lower priority. In one or more embodiments of the invention, a low priority SLA parameter indicates that the packets of the associated connection should be processed and/or transmitted behind, or less frequently than, packets of other connections. In one or more embodiments of the invention, a maximum bandwidth SLA parameter indicates the maximum rate at which that the packets of the associated connection should be transmitted. SLA parameters for a maximum or minimum bandwidth include, for example, 0 megabits per second, 10 megabits per second, or 100 gigabits per second. In one embodiment of the invention, SLA parameters (such as priority) may be applied in different ways by different layers and network devices (e.g., network device (104)) along the path of the connection.

In one or more embodiments of the invention, the OS uses the entries in the SLA data structure (118) to implement the SLA for the connection. Specifically, the OS (110) may determine the manner in which the SLA for the connection is applied to packets of the connection. Applying the SLA for a connection may include informing other elements (e.g., network protocol stack, network interface, network device, etc.) along the connection path of the SLA. In one or more embodiments of the invention, the OS (110) may translate the SLA parameters into instructions or requests acceptable by the network protocol stack (114) and other network elements. In one or more embodiments of the invention, each element (e.g., network protocol stack, network interface, network device, etc.) along the connection may implement the SLA in a manner specific to that element. In one or more embodiment of the invention, one or more elements may not support any implementation of the SLA for a connection. In one or more embodiment of the invention, one or more elements may include support for one SLA parameter or range of parameters and lack support for another SLA parameter or range of parameters.

The network protocol stack (114) may, for example, process data for a high priority connection (e.g., connection corresponding to connection endpoint A (112A)) more frequently than data for the other connections (e.g., connections corresponding to connection endpoint N (112N), connection endpoint AA (112AA), and connection endpoint NN (112NN)) on the OS (108). The network interface (102) may, for example, transmit packets from a high priority connection (e.g., connection corresponding to connection endpoint A (112A)) to the network device (104) using a separate buffer from the buffer used for packets of other connections (e.g., connections corresponding to connection endpoint N (112N), connection endpoint AA (112AA), and connection endpoint NN (112NN)) on the OS (108).

Figure 2:
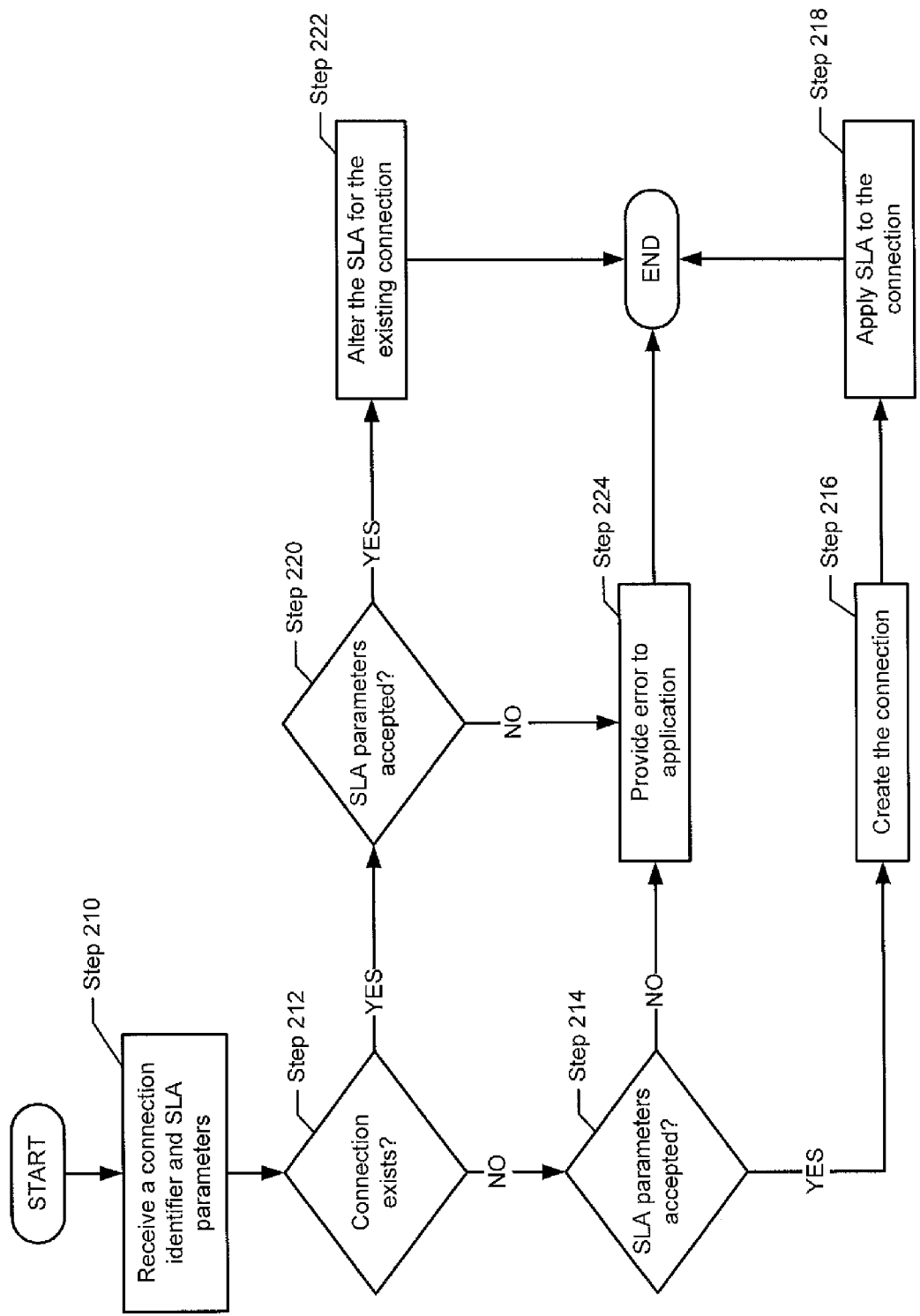
FIG. 2 shows a flow diagram in accordance with one or more embodiments of the invention.

FIG. 2 shows a flowchart for associating a SLA with a connection in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 210, the OS receives a connection identifier and a SLA. In Step 212, the OS determines whether a connection corresponding to the connection identifier exists (e.g., whether the request is to create a connection or to bind a current connection). In one or more embodiments of the invention, a connection may not exist because the connection has not be created or initialized by the OS. If in Step 212, the OS determines that the connection corresponding to the connection identifier does not exist, then in Step 214, the OS determines whether the SLA parameters are accepted. Further detail regarding Step 214 is provided in FIG. 3.

If in Step 214, the OS determines that the SLA parameters are accepted, then Step 216, the OS creates the connection. In one or more embodiments of the invention, a connection is created by initializing a socket using a port specified by the application. In Step 218, the OS applies the SLA to the connection. In one or more embodiments of the invention, applying the SLA to the connection includes creating a new entry in the SLA data structure for the connection and storing the SLA parameters with the connection in the SLA data structure.

If in Step 212, the OS determines that the connection corresponding to the connection identifier does exist, then in Step 220, the OS determines whether the SLA parameters are accepted in the same manner as in Step 214. Further detail regarding Step 220 is provided in FIG. 3. If in Step 220, the OS determines that the SLA is accepted, then in Step 222, the OS alters the SLA of the existing connection. In one or more embodiments of the invention, altering the SLA of an existing connection includes overwriting the previously stored SLA parameters with the received SLA parameters for the connection in the SLA data structure.

If in Step 214 or in Step 220, the OS determines that the SLA parameters are not accepted, then in Step 224, the OS provides the SLA error to the requesting application.

Figure 3:
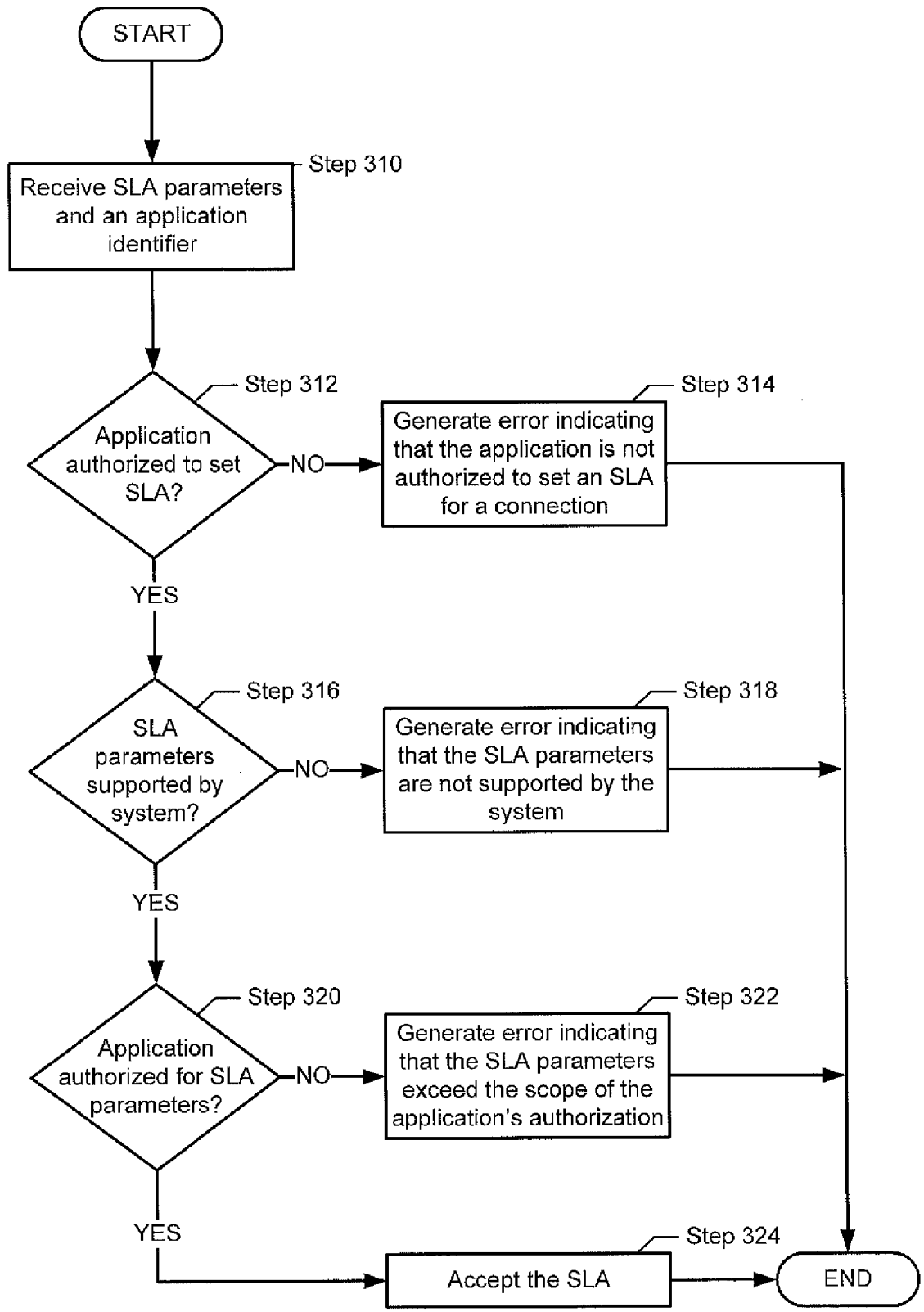
FIG. 3 shows a flow diagram in accordance with one or more embodiments of the invention.

FIG. 3 shows a flowchart for determining whether a SLA is acceptable in accordance with one or more embodiments of the invention. While the various steps in the flowchart are presented and described sequentially, one of ordinary skill will appreciate that some or all of the steps may be executed in different orders, may be combined or omitted, and some or all of the steps may be executed in parallel.

In Step 310, the OS receives a SLA (e.g., corresponding to the SLA received in Step 210 in FIG. 2) and an application identifier corresponding to the application requesting to implement the SLA on a connection. In Step 312, the OS determines whether the requesting application corresponding to the application identifier is authorized to set a SLA for a connection. In one or more embodiments of the invention, the OS consults the application permissions table to make the determination. Specifically, the OS may compare the submitted SLA to the restrictions and/or limitations stored in the application permissions table under the application identifier.

If in Step 312, the OS determines that the application is not authorized to set a SLA for a connection, then in Step 314, the OS generates error indicating that the application is not authorized to set a SLA for a connection. In one or more embodiments of the invention, the OS determines that the application is not authorized to set a SLA when the entry in application permissions table indicates that the application is not authorized to set a SLA (regardless of the parameters).

If in Step 312, the OS determines that the application is authorized to set a SLA for a connection, then in Step 316, the OS determines whether the parameters of the SLA are supported by the system. In one or more embodiments of the invention, an application may be authorized to set the SLA for a connection, but the submitted SLA parameters are outside the ability of the OS (or other elements along the connection path) to enforce or implement. For example, an application authorized to set or alter the minimum bandwidth for a connection may submit SLA parameters indicating a minimum bandwidth that exceeds the maximum available bandwidth of the system. If in Step 316, the OS determines that the SLA parameters are not supported by the system, then in Step 318, the OS generates an error indicating that the SLA parameters are not supported by the system. In the example above, the OS generates an error indicating that the minimum bandwidth submitted by the application exceeds the maximum available bandwidth of the system.

If in Step 316, the OS determines that the SLA parameters are supported by the system, then in Step 320, the OS determines whether the SLA parameters exceed the scope of the application's authorization. In one or more embodiments of the invention, an application may be authorized to set the SLA for a connection, but is limited (using the application permissions table) to a range of values that may be set or altered (even if the system supports SLA parameters beyond the limitations placed on the application). For example, an application may be authorized to set a minimum bandwidth up to 5% of the total system bandwidth, but SLA parameters that set a minimum bandwidth exceeding 5% of the total system bandwidth are outside the scope of the application's authorization.

If in Step 320, the OS determines that the SLA parameters exceed the scope of the application's authorization, then in Step 322, the OS generates an error indicating that the SLA parameters exceed the scope of the application's authorization. If in Step 320, the OS determines that the SLA parameters do not exceed the scope of the application's authorization, then in Step 324, the OS accepts the SLA.

Figure 4A:
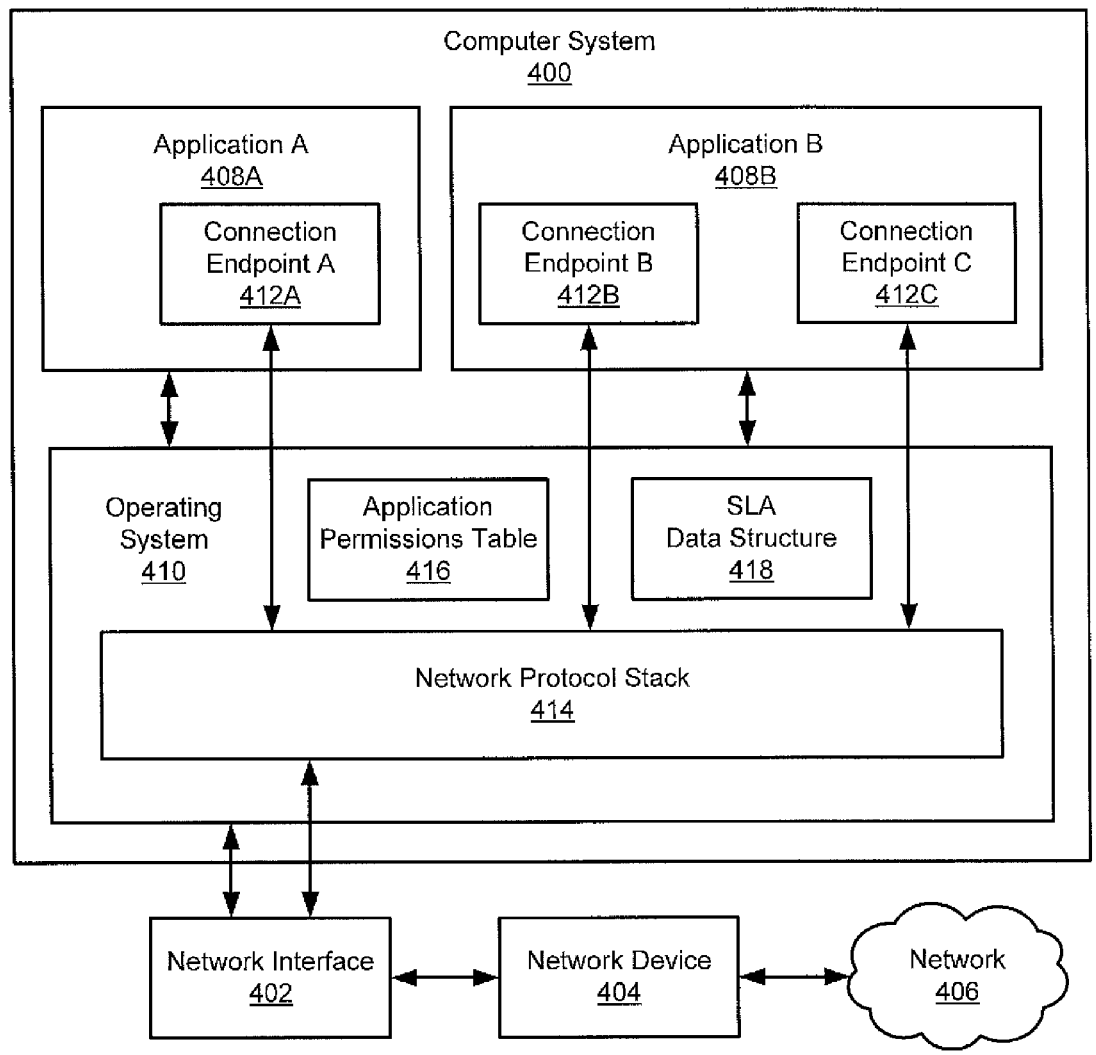

FIGS. 4A-4D show an example in accordance with one or more embodiments of the invention. Specifically, FIG. 4A shows an example system in accordance with one or more embodiments of the invention. As shown in FIG. 4A, the example system includes a computer system (400) communicatively coupled to a network interface (402). The network interface (402) provides the computer system (400) access to the network (406) via a network device (404). The computer system includes an OS (410) hosting application A (408A) and application B (408B). Application A (408A) includes connection endpoint A (412A) and application B (408B) includes connection endpoint B (412B) and connection endpoint C (412C). The OS (410) includes a network protocol stack (414), an application permissions table (416), and a SLA data structure (418).

For the purposes of the example depicted in FIG. 4, assume that the application permissions table (416) indicates that application A (408A) is authorized to set the priority of a connection, but is restricted to setting the priority to medium or low. Assume further that the application permissions table (416) indicates that application B (408B) is authorized to set the priority of a connection to low, medium, or high. Finally, assume that the application permissions table (416) indicates that application B (408B) is authorized to set a maximum bandwidth with no restrictions.

FIG. 4B shows an example timeline in accordance with one or more embodiments of the invention. In Step 430, application A (408A) sends a connection identifier, connection endpoint A (412A), and a SLA parameter indicating a priority of high to the OS (410). In Step 432, the OS (410) determines that a connection corresponding to the connection identifier does not exist. Also in Step 432, the OS (410) accesses the application permissions table (414) and determines that application A (408A) is authorized to set the priority of a connection, but that the submitted priority exceeds the scope of application A's (408A) authorization. In Step 434, the OS (410) sends an error to application A (408A) indicating that the SLA parameter exceeds the scope of application A's (408A) authorization.

In Step 436, application A (408A) sends the same connection identifier, connection endpoint A (412A), and a SLA parameter indicating a priority of medium to the OS (410). In Step 438, the OS (410) determines that a connection corresponding to the connection identifier does not exist. The OS (410) also accesses the application permissions table (414) and determines that application A (408A) is authorized to set the priority of a connection, and that the submitted priority is within the scope of application A (408A)'s authorization. Also at Step 438, the OS (410) creates connection endpoint A (412A) targeting application A (408A) and stores the connection identifier, connection endpoint A (412A), in the SLA data structure (418) mapped to a priority of medium.

In Step 440, the OS (410) instructs the network protocol stack (414) to process packets to and from connection endpoint A (412A) with a medium priority. In Step 442, the OS (410) instructs the network interface (402) to transmit packets to and from connection endpoint A (412A) with a medium priority. Also in Step 442, the OS (410) instructs the network interface (402) to instruct the network device (404) to transmit packets to and from connection endpoint A (412A) with a medium priority.

In Step 444, application B (408B) sends a connection identifier, connection endpoint B (412B), and a SLA parameter indicating a priority of low to the OS (410). In Step 446, the OS (410) determines that a connection corresponding to the connection identifier does exist. The OS (410) also accesses the application permissions table (414) and determines that application B (408B) is authorized to set the priority of a connection, and that the submitted priority is within the scope of application B (408B)'s authorization. Also at Step 446, the OS (410) creates connection endpoint B (412B) targeting application B (408B) and stores the connection identifier, connection endpoint B (412B), in the SLA data structure (418) mapped to a priority of low.

In Step 448, the OS (410) instructs the network protocol stack (414) to process packets to and from connection endpoint B (412B) with a low priority. In Step 450, the OS (410) instructs the network interface (402) to transmit packets to and from connection endpoint B (412B) with a low priority. Also in Step 450, the OS (410) instructs the network interface (402) to instruct the network device (404) to transmit packets to and from connection endpoint B (412B) with a low priority.

In Step 452, application B (408B) sends a connection identifier, connection endpoint C (412C), and a SLA parameter indicating a priority of high to the OS (410). In Step 454, the OS (410) determines that a connection corresponding to the connection identifier does exist. The OS (410) also accesses the application permissions table (414) and determines that application B (408B) is authorized to set the priority of a connection, and that the submitted priority is within the scope of application B (408B)'s authorization. Also at Step 454, the OS (410) creates connection endpoint C (412C) and stores the connection identifier, connection endpoint C (412C), in the SLA data structure (418) mapped to a priority of high.

In Step 456, the OS (410) instructs the network protocol stack (414) to process packets to and from connection endpoint C (412C) with a high priority. In Step 458, the OS (410) instructs the network interface (402) to transmit packets to and from connection endpoint C (412C) with a high priority. Also in Step 458, the OS (410) instructs the network interface (402) to instruct the network device (404) to transmit packets to and from the connection endpoint C (412C) with a high priority.

Figure 4C:
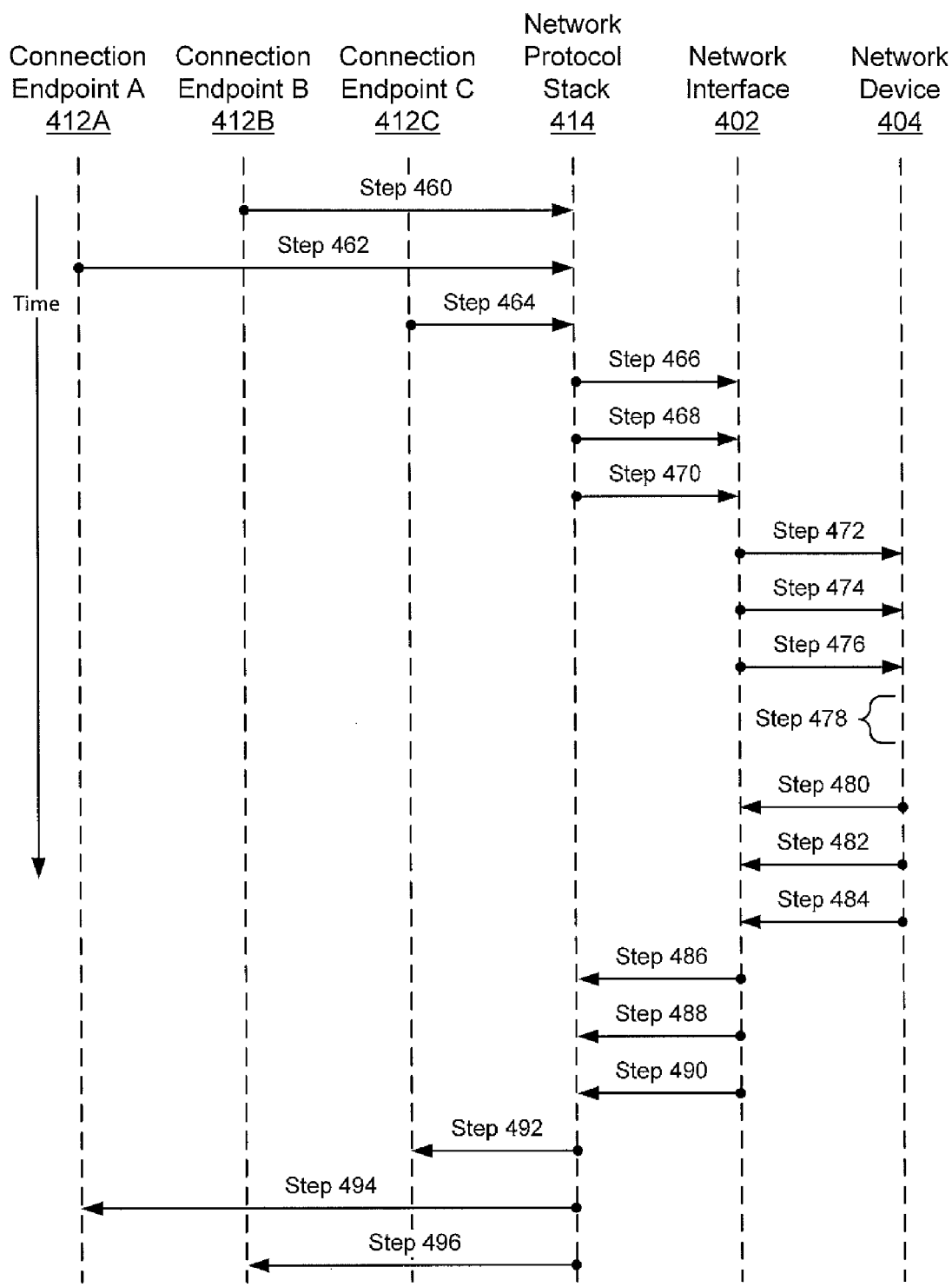

FIG. 4C shows a timeline in accordance with one or more embodiments of the invention. Specifically, FIG. 4C shows a timeline continuation of the timeline shown in FIG. 4B. In Step 460, application B (408B) sends data using connection endpoint B (412B) to the network protocol stack (414). In Step 462, application A (408A) sends data using connection endpoint A (412A) to the network protocol stack (414). In Step 464, application B (408B) sends data using connection endpoint C (412C) to the network protocol stack (414).

In Step 466, the network protocol stack (414) determines that the data for connection endpoint C (412C) has a priority of high, processes the data for connection endpoint C (412C), and transmits the data for connection endpoint C (412C) to the network interface (402) first. In Step 468, the network protocol stack (414) determines that the data for connection endpoint A (412A) has a priority of medium, processes the data for connection endpoint A (412A), and transmits the data for connection endpoint A (412A) to the network interface (402) second. In Step 470, the network protocol stack (414) determines that the data for connection endpoint B (412B) has a priority of low, processes the data for connection endpoint B (412B), and transmits the data for connection endpoint B (412B) to the network interface (402) last.

In Step 472, the network interface (402) determines that the data for connection endpoint C (412C) has a priority of high and transmits the data for connection endpoint C (412C) to the network device (404) first. In Step 474, the network interface (402) determines that the data for connection endpoint A (412A) has a priority of medium and transmits the data for connection endpoint A (412A) to the network device (404) second. In Step 476, the network interface (402) determines that the data for connection endpoint B (412B) has a priority of low and transmits the data for connection endpoint B (412B) to the network device (404) last.

In Step 478, the network device (404) receives, from the network (406), packets targeting connection endpoint B (412B), packets targeting connection endpoint A (412A), and packets targeting connection endpoint C (412C). In Step 480, the network device (404) determines that the data for connection endpoint C (412C) has a priority of high and transmits the data for connection endpoint C (412C) to the network interface (402) first. In Step 482, the network device (404) determines that the data for connection endpoint A (412A) has a priority of medium and transmits the data for connection endpoint A (412A) to the network interface (402) second. In Step 484, the network device (404) determines that the data for connection endpoint B (412B) has a priority of low and transmits the data for connection endpoint B (412B) to the network interface (402) last.

In Step 486, the network interface (402) determines that the data for connection endpoint C (412C) has a priority of high and transmits the data for connection endpoint C (412C) to the network protocol stack (414) first. In Step 488, the network interface (402) determines that the data for connection endpoint A (412A) has a priority of medium and transmits the data for connection endpoint A (412A) to the network protocol stack (414) second. In Step 490, the network interface (402) determines that the data for connection endpoint B (412B) has a priority of low and transmits the data for connection endpoint B (412B) to the network protocol stack (414) last.

In Step 492, the network protocol stack (414) determines that the data for connection endpoint C (412C) has a priority of high, processes the data for connection endpoint C (412C), and provides the data to connection endpoint C (412C) first. In Step 494, the network protocol stack (414) determines that the data for connection endpoint A (412A) has a priority of medium, processes the data for connection endpoint A (412A), and provides the data to connection endpoint A (412A) second. In Step 496, the network protocol stack (414) determines that the data for connection endpoint B (412B) has a priority of low, processes the data for connection endpoint B (412B), and provides the data to connection endpoint B (412B) last.

Figure 4D:
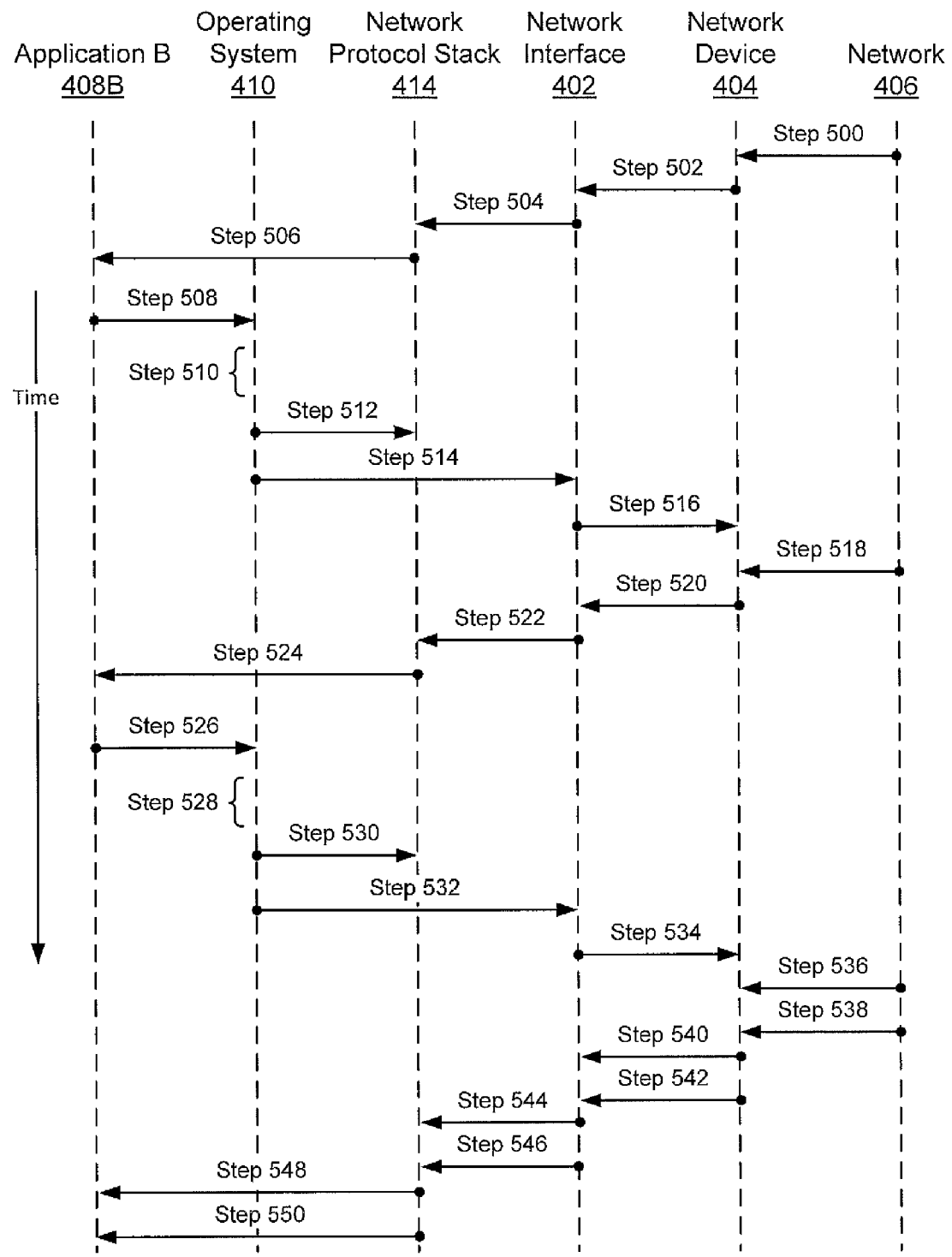

FIG. 4D shows a timeline in accordance with one or more embodiments of the invention. Specifically, FIG. 4D shows a timeline continuation of the timeline shown in FIG. 4C. In Step 500, the network device (404) receives data targeting connection endpoint B (412B) from the network (406). In Step 502, the network device (404) transmits the data to the network interface (402). In Step 504, the network interface (402) transmits the data to the network protocol stack (414). In Step 506, the network protocol stack (414) provides the data to application B (408B).

In Step 508, application B (408B) determines it wants to set a SLA parameter of 10 gigabits per second for the maximum bandwidth SLA for connection endpoint B (412B). Also in Step 508, application B (408B) sends the connection identifier, connection endpoint B (412B), and the SLA parameter of 10 gigabits per second for maximum bandwidth to the OS (410).

In Step 510, the OS (410) determines that a connection corresponding to the connection identifier exists. The OS (410) also accesses the application permissions table (414) and determines that application B (408B) is authorized to set the maximum bandwidth of a connection, and that the submitted maximum bandwidth is within the scope of application B (408B)'s authorization. Also at Step 510, the OS (410) stores the connection identifier, connection endpoint B (412B), in the SLA data structure (418) mapped to a maximum bandwidth of 10 gigabits per second.

In Step 512, the OS (410) instructs the network protocol stack (414) to process packets to and from connection endpoint B (412B) with a maximum bandwidth of 10 gigabits per second. In Step 514, the OS (410) instructs the network interface (402) to transmit packets to and from connection endpoint B (412B) with a maximum bandwidth of 10 gigabits per second. Also in Step 514, the OS (410) instructs the network interface (402) to instruct the network device (404) to transmit packets to and from the connection endpoint B (412B) with a maximum bandwidth of 10 gigabits per second. In Step 516, the network interface (402) instructs the network device (404) to transmit packets to and from the connection endpoint B (412B) with a maximum bandwidth of 10 gigabits per second.

In Step 518, the network device (404) receives a large amount of data targeting connection endpoint B (412B) from the network (406). In Step 520, the network device (404) transmits the data to the network interface (402) at a maximum bandwidth of 10 gigabits per second. In Step 522, the network interface (402) transmits the data to the network protocol stack (414) at a maximum bandwidth of 10 gigabits per second. In Step 524, the network protocol stack (414) provides the data to application B (408B) at a maximum bandwidth of 10 gigabits per second.

In Step 526, application B (408B) determines that the pattern of the data received indicates a possible denial of service attack, and to avoid an interruption in services using other connections, the maximum bandwidth for connection endpoint B (412B) should be reduced. Also in Step 528, application B (408B) sends the connection identifier, connection endpoint B (412B), and the SLA parameter of 10 megabits per second for maximum bandwidth to the OS (410).

In Step 528, the OS (410) determines that a connection corresponding to the connection identifier exists. The OS (410) also accesses the application permissions table (414) and determines that application B (408B) is authorized to set the maximum bandwidth of a connection, and that the submitted maximum bandwidth is within the scope of application B (408B)'s authorization. Also at Step 528, the OS (410) stores the maximum bandwidth of 10 gigabits per second mapped to the connection identifier, connection endpoint B (412B), in the SLA data structure (418).

In Step 530, the OS (410) instructs the network protocol stack (414) to process packets to and from connection endpoint B (412B) with a maximum bandwidth of 10 megabits per second. In Step 532, the OS (410) instructs the network interface (402) to transmit packets to and from connection endpoint B (412B) with a maximum bandwidth of 10 megabits per second. Also in Step 532, the OS (410) instructs the network interface (402) to instruct the network device (404) to transmit packets to and from the connection endpoint B (412B) with a maximum bandwidth of 10 megabits per second. In Step 534, the network interface (402) instructs the network device (404) to transmit packets to and from the connection endpoint B (412B) with a maximum bandwidth of 10 megabits per second.

In Step 536, the network device (404) receives another large amount of data targeting connection endpoint B (412B) from the network (406). In Step 538, the network device (404) receives other data targeting connection endpoint C (412C) from the network (406). In Step 540, the network device (404) receives the data for the connection endpoint B (412B) and the data for connection endpoint C (412C). Also in Step 540, the network device (404) transmits the data for connection endpoint C (412C) without a bandwidth restriction to the network interface (402). In Step 542, the network device (404) transmits the data for connection endpoint B (412B) to the network interface (402) at a maximum bandwidth of 10 megabits per second.

In Step 544, the network interface (402) receives the data for the connection endpoint B (412B) and the data for connection endpoint C (412C). Also in Step 544, the network interface (402) transmits the data for connection endpoint C (412C) without a bandwidth restriction to the network protocol stack (414). In Step 546, the network interface (402) transmits the data for connection endpoint B (412B) to the network protocol stack (414) at a maximum bandwidth of 10 megabits per second.

In Step 548, the network protocol stack (414) receives the data for the connection endpoint B (412B) and the data for connection endpoint C (412C). Also in Step 548, the network protocol stack (414) processes and transmits the data for connection endpoint C (412C) without a bandwidth restriction to application B (408B). In Step 550, the network protocol stack (414) processes and transmits the data for connection endpoint C (412C) to application B (408B) at a maximum bandwidth of 10 megabits per second.

Figure 5:
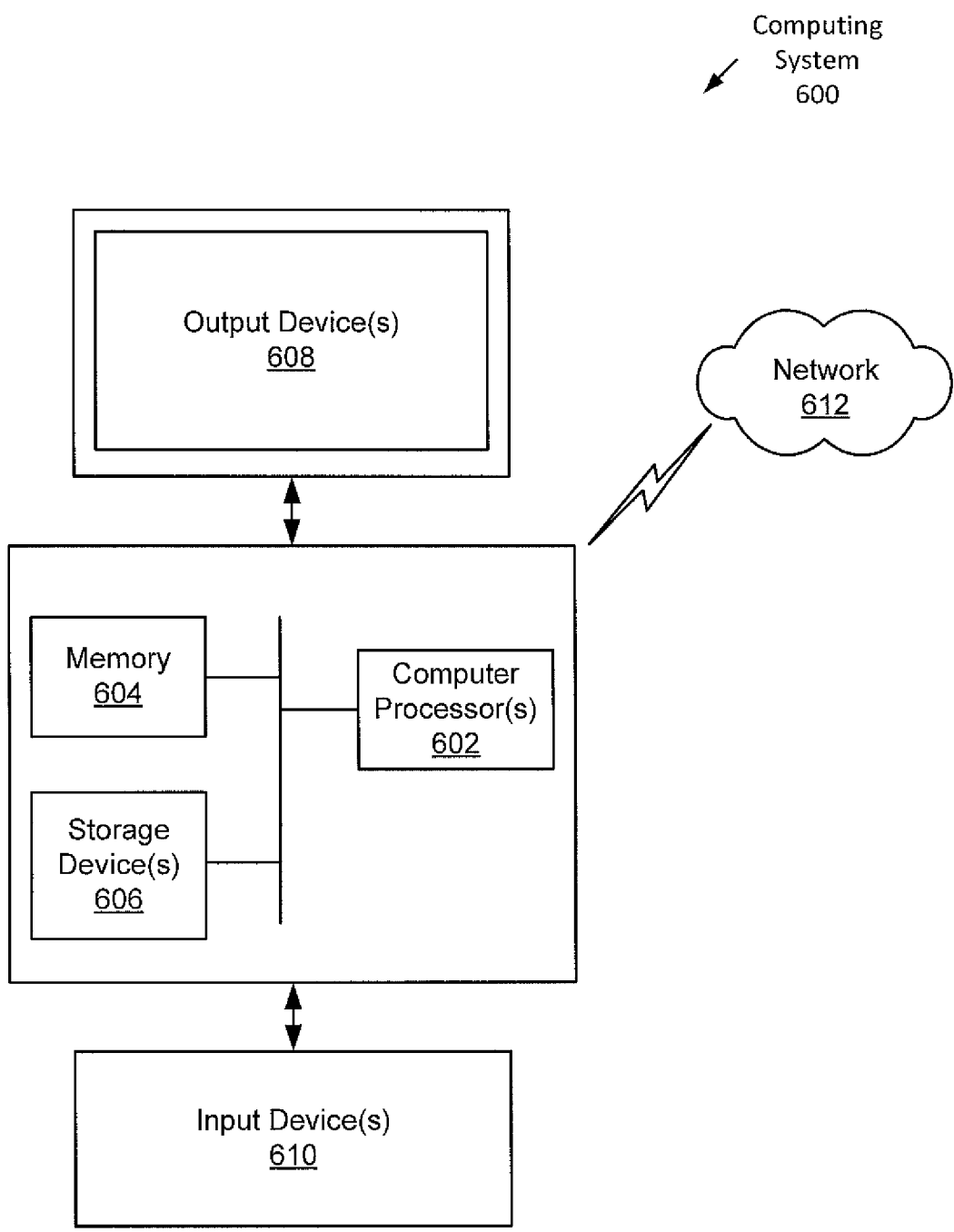
FIG. 5 shows a computer system in accordance with one or more embodiments of the invention.

Embodiments of the invention may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and connected to the other elements over a network (612). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for handling connection requests comprising:
receiving, by an operating system (OS), a first request from an application to create a first connection,
wherein the first request comprises a first connection identifier and a first service-level agreement (SLA) comprising a value for each of a plurality of SLA parameters, and
wherein the first SLA is set by the application via the OS;
determining, by the OS, that the application is authorized to create the first connection,
wherein determining that the application is authorized to create the first connection comprises:
retrieving an entry for the application from an application permissions table, the entry mapping an application identifier of the application to an OS task that sets the first SLA for the first connection, the entry comprising a restriction on the value for a first SLA parameter of the plurality of SLA parameters;
comparing the value for the first SLA parameter with the restriction to determine that the application is authorized;
setting the value for the first SLA parameter in a first SLA data structure corresponding to the first SLA based on the value satisfying the restriction;
creating, by the OS, the first connection targeting the application in response to the determination that the application is authorized to create the first connection;
mapping, in response to the determination that the application is authorized to create the first connection, the first connection to the first SLA in the first SLA data structure;
receiving first incoming data targeting the first connection identifier from a network;
processing, by a network protocol stack on the OS, the first incoming data according to the first SLA in the first SLA data structure to obtain first processed incoming data; and
providing, by the OS, the first processed incoming data to the application.

2. The method of claim 1, further comprising:
receiving outgoing data for the first connection identifier from the application;
processing, by the network protocol stack, the outgoing data according to the first SLA to obtain processed outgoing data; and
sending the processed outgoing data to a destination address on the network.

3. The method of claim 1, further comprising:
receiving, by the OS, a second request from the application to create a second connection, wherein the second request comprises a second connection identifier and a second SLA;

determining, by the OS, that the application is authorized to create the second connection;
creating, by the OS, the second connection targeting the application in response to the determination that the application is authorized to create the second connection;
mapping the second connection to the second SLA in response to the determination that the application is authorized to create the second connection;
receiving second incoming data targeting the second connection identifier from the network;
processing, by the network protocol stack, the second incoming data according to the second SLA to obtain second processed incoming data; and
providing, by the OS, the second processed incoming data to the application.

4. The method of claim 3,
wherein the first SLA comprises a first priority,
wherein the second SLA comprise a second priority,
wherein processing the first incoming data according to the first SLA to obtain first processed incoming data comprises processing the first data according to the first priority, and
wherein processing the second incoming data according to the second SLA to obtain second processed incoming data comprises processing the second incoming data according to the second priority.

5. The method of claim 1, further comprising:
receiving, by the OS, a second request from the application comprising the first connection identifier and a second SLA, wherein the second request is sent by the application in response to a determination that the first processed incoming data is received at a rate exceeding a desired maximum bandwidth;
mapping the first connection to the second SLA in response to the determination that the application is authorized to set the second SLA for the first connection;
receiving second incoming data targeting the first connection identifier from the network;
processing, by the network protocol stack, the second incoming data according to the second SLA to obtain second processed incoming data; and
providing, by the OS, the second processed incoming data to the application.

6. A non-transitory computer readable medium comprising instructions that, when executed by a computer processor, perform a method for handling connection requests, the method comprising:
receiving, by an operating system (OS), a first request from an application to create a first connection,
wherein the first request comprises a first connection identifier and a first service-level agreement (SLA) comprising a value for each of a plurality of SLA parameters, and
wherein the first SLA is set by the application via the OS;
determining, by the OS, that the application is authorized to create the first connection,
wherein determining that the application is authorized to create the first connection comprises:
retrieving an entry for the application from an application permissions table, the entry mapping an application identifier of the application to an OS task that sets the first SLA for the first connection, the entry comprising a restriction on the value for a first SLA parameter of the plurality of SLA parameters;
comparing the value for the first SLA parameter with the restriction to determine that the application is authorized;
setting the value for the first SLA parameter in a first SLA data structure corresponding to the first SLA based on the value satisfying the restriction;
creating, by the OS, the first connection targeting the application in response to the determination that the application is authorized to create the first connection;
mapping, in response to the determination that the application is authorized to create the first connection, the first connection to the first SLA in the first SLA data structure;
receiving first incoming data targeting the first connection identifier from a network;
processing, by a network protocol stack on the OS, the first incoming data according to the first SLA in the first SLA data structure to obtain first processed incoming data; and
providing, by the OS, the first processed incoming data to the application.

7. The non-transitory computer readable medium of claim 6, the method further comprising:
receiving outgoing data for the first connection identifier from the application;
processing, by the network protocol stack, the outgoing data according to the first SLA to obtain processed outgoing data; and
sending the processed outgoing data to a destination address on the network.

8. The non-transitory computer readable medium of claim 6, the method further comprising:
receiving, by the OS, a second request from the application to create a second connection, wherein the second request comprises a second connection identifier and a second SLA;
determining, by the OS, that the application is authorized to create the second connection;
creating, by the OS, the second connection targeting the application in response to the determination that the application is authorized to create the second connection;
mapping the second connection to the second SLA in response to the determination that the application is authorized to create the second connection;
receiving second incoming data targeting the second connection identifier from the network;
processing, by the network protocol stack, the second incoming data according to the second SLA to obtain second processed incoming data; and
providing, by the OS, the second processed incoming data to the application.

9. The non-transitory computer readable medium of claim 8,
wherein the first SLA comprises a first priority,
wherein the second SLA comprise a second priority,
wherein processing the first incoming data according to the first SLA to obtain first processed incoming data comprises processing the first incoming data according to the first priority, and
wherein processing the second incoming data according to the second SLA to obtain second processed incoming data comprises processing the second incoming data according to the second priority.

10. The non-transitory computer readable medium of claim 6, the method further comprising:
receiving, by the OS, a second request from the application comprising the first connection identifier and a second SLA, wherein the second request is sent by the application in response to a determination that the first processed incoming data is received at a rate exceeding a desired maximum bandwidth;
mapping the first connection to the second SLA in response to the determination that the application is authorized to set the second SLA for the first connection;
receiving second incoming data targeting the first connection identifier from the network;
processing, by the network protocol stack, the second incoming data according to the second SLA to obtain second processed incoming data; and
providing, by the OS, the second processed incoming data to the application.

11. A system for handling connection requests comprising:
a computer processor;
an operating system (OS), executing on the computer processor, configured to:
receive a first request from an application to create a first connection,
wherein the first request comprises a first connection identifier and a first service-level agreement (SLA) comprising a value for each of a plurality of SLA parameters, and
wherein the first SLA is set by the application via the OS;
determine that the application is authorized to create the first connection,
wherein determining that the application is authorized to create the first connection comprises:
retrieving an entry for the application from an application permissions table, the entry mapping an application identifier of the application to an OS task that sets the first SLA for the first connection, the entry comprising a restriction on the value for a first SLA parameter of the plurality of SLA parameters;
comparing the value for the first SLA parameter with the restriction to determine that the application is authorized;
setting the value for the first SLA parameter in a first SLA data structure corresponding to the first SLA based on the value satisfying the restriction;
create the first connection targeting the application in response to the determination that the application is authorized to create the first connection; and
map, in response to the determination that the application is authorized to create the first connection, the first connection to the first SLA in the first SLA data structure; and
a network protocol stack configured to:
receive first incoming data targeting the first connection identifier from a network;
process the first incoming data according to the first SLA in the first SLA data structure to obtain first processed incoming data; and
provide the first processed incoming data to the application.

12. The system of claim 11,
wherein the network protocol stack is further configured to:
receive outgoing data for the first connection identifier from the application;
process the outgoing data according to the first SLA to obtain processed outgoing data; and
send the processed outgoing data to a destination address on the network.

13. The system of claim 11,
wherein the OS is further configured to:
receive a second request from the application to create a second connection, wherein the second request comprises a second connection identifier and a second SLA;
determine that the application is authorized to create the second connection;
create the second connection targeting the application in response to the determination that the application is authorized to create the second connection; and
map the second connection to the second SLA in response to the determination that the application is authorized to create the second connection, and
wherein the network protocol stack is further configured to:
receive second incoming data targeting the second connection identifier from the network;
process the second incoming data according to the second SLA to obtain second processed incoming data; and
provide the second processed incoming data to the application.

14. The system of claim 11,
wherein the OS is further configured to:
receive a second request from the application comprising the first connection identifier and a second SLA, wherein the second request is sent by the application in response to a determination that the first processed incoming data is received at a rate exceeding a desired maximum bandwidth;
map the first connection to the second SLA in response to the determination that the application is authorized to set the second SLA for the first connection, and
wherein the network protocol stack is further configured to:
receive second incoming data targeting the first connection identifier from the network;
process the second incoming data according to the second SLA to obtain second processed incoming data; and
provide the second processed incoming data to the application.

15. The system of claim 11,
wherein the system further comprises a network interface, and
wherein the network protocol stack is executing on the network interface.

* * * * *

UNITED STATES PATENT AND TRADEMARK OFFICE
CERTIFICATE OF CORRECTION

PATENT NO. : 9,544,202 B2  
APPLICATION NO. : 14/014004  
DATED : January 10, 2017  
INVENTOR(S) : Yenduri et al.

Page 1 of 1

It is certified that error appears in the above-identified patent and that said Letters Patent is hereby corrected as shown below:

In Column 16, Line 9, in Claim 6, delete "restriction:" and insert -- restriction; --, therefor.

Signed and Sealed this  
Eighth Day of August, 2017

Joseph Matal  
*Performing the Functions and Duties of the*  
*Under Secretary of Commerce for Intellectual Property and*  
*Director of the United States Patent and Trademark Office*